(12) United States Patent
Surasinghe

(10) Patent No.: US 8,073,858 B2
(45) Date of Patent: Dec. 6, 2011

(54) METHOD OF SELECTIVELY DISPLAYING DATA

(75) Inventor: Lakshitha C. Surasinghe, Kotte (LK)

(73) Assignee: Millennium IT (USA) Inc., Jersey City, NJ (US)

( * ) Notice: Subject to any disclaimer, the term of this patent is extended or adjusted under 35 U.S.C. 154(b) by 1194 days.

(21) Appl. No.: 11/525,506

(22) Filed: Sep. 22, 2006

(65) Prior Publication Data

US 2007/0219935 A1    Sep. 20, 2007

Related U.S. Application Data

(60) Provisional application No. 60/720,119, filed on Sep. 23, 2005.

(51) Int. Cl.
*G06F 7/00* (2006.01)
*G06F 17/30* (2006.01)

(52) U.S. Cl. ........................................ 707/757

(58) Field of Classification Search ............... None
See application file for complete search history.

(56) References Cited

U.S. PATENT DOCUMENTS

| | | | |
|---|---|---|---|
| 6,408,282 B1 | 6/2002 | Buist | |
| 2003/0182220 A1 | 9/2003 | Galant | |
| 2005/0075965 A1* | 4/2005 | Cutler | 705/37 |
| 2005/0187855 A1 | 8/2005 | Brennan | |
| 2006/0174189 A1* | 8/2006 | Weitzman et al. | 715/503 |

* cited by examiner

*Primary Examiner* — Michael Hicks
(74) *Attorney, Agent, or Firm* — Cesari and McKenna, LLP

(57) ABSTRACT

To provide data to a user front end while conserving processor resources and network bandwidth, a front end driver operates between the user front end and data processing and storage devices. When users access databases from the user front end, the front end driver maintains virtual objects containing control information associated with the windows and data items visible at the user front end. The user front end need only maintain data corresponding to the visible data items, while the front end driver provides updated versions of the visible data items to the user front end. The updated data items may be provided at refresh intervals, independent of the rate at which the front end driver downloads data from the storage devices. Thus, the system provides access to all database data in a manner that appears to the user as real time, while conserving resources at the user front end.

33 Claims, 3 Drawing Sheets

VIEW A

VIEW B

VIEW A

VIEW B

METHOD OF SELECTIVELY DISPLAYING DATA

CROSS-REFERENCE TO RELATED APPLICATIONS

The present application claims the benefit of U.S. Provisional Patent Application Ser. No. 60/720,119, which was filed on Sep. 23, 2005, by Lakshitha C. Surasinghe for a METHOD OF SELECTIVELY DISPLAYING DATA and is hereby incorporated by reference.

BACKGROUND OF THE INVENTION

1. Field of the Invention

The invention relates generally to data processing systems and, in particular, to systems that selectively display data.

2. Background Information

In known systems that use data that are updated frequently remote users download, for example, database tables, and are provided in real time updated data for the various entries in the tables. Thus, a remote user who makes use of one or more rows of a large database table must download the entire table to display the data in the rows of interest. In the example discussed below, a remote user who is a stock trader downloads a stock trading table that includes information for thousands of stocks in thousands of table rows. The thousands of rows are updated in real time, and thus, the remote user must utilize network bandwidth and front end memory that are sufficient to download, update and maintain the stock trading table.

Many users require the information for only a relatively small number of stocks. However, their front end systems must be capable of storing, maintaining and operating the entire stock trading table. Further, their networks must be capable of supplying updates to the various users in a sufficiently timely manner to promote trading. Accordingly, many of the users are required to have systems that have capabilities that are well beyond what would be required if only the data of interest are made available. What is needed is a system and method of operation that provides to respective users data of interest out of a larger collection of data in a manner that is sufficiently timely to promote real time use and updating of the data of interest.

SUMMARY OF THE INVENTION

The invention is a system and method of selectively providing data of interest to a user and making available to the user other data that may become of interest in a manner that promotes real time use of the data. The system includes a front end driver that operates between a user front end and data processing and storage devices. The front end driver controls the providing of data to the user front end based on what is visible to a user through the user front end at refresh times. The front end driver also controls the updating of the data such that the visible data are updated during the refresh cycles, which are shorter than the times associated with refreshing, scrolling and resizing operations performed through the user front end display.

More specifically, the front end driver maintains virtual objects that contain control information for the windows and controls that are open at the user front end. The control information associated with, for example, a database table, includes the top row then visible and the total number of rows visible in the given display, that is, within the dimensions of the associated window. The front end driver sends the data for the visible rows to the user front end and thereafter updates the data for the visible rows during refresh operations that occur at intervals that are fractions of a second. If the user changes the size of the respective windows or scrolls down a table, the system updates the associated control information and provides to the user front end the data for the newly visible rows at the next refresh cycle. The user front end thus need maintain only data that correspond to the visible rows, and yet the system has available to the user all of the data from the database table in a manner that appears to the user as real time, and given the timing of operations at the user front end is essentially real time.

BRIEF DESCRIPTION OF THE DRAWINGS

The invention description below refers to the accompanying drawings, of which.

DETAILED DESCRIPTION OF AN ILLUSTRATIVE EMBODIMENT

A system 10 that provides data from data processing and storage devices 130 to users includes for each user a user front end 100 through which the user logs onto the system, views data, and so forth. A front end driver 120 communicates with the user front end and also with the data processing and storage devices 130, to provide user-requested data to the user front end for display. One example of such a system is a trading system that provides to the users market information, information relating to selected stocks, and so forth. The information is updated at the devices 130 frequently with information provided over a network (not shown), and the front end driver controls the updating of the displayed information at the user front end in a manner that appears to the user as real time.

A stock trading table may have thousands of rows to provide information for thousands of stocks, though a particular user may be interested in viewing the information relating to only a few of the stocks at any given time. As discussed in more detail below, the front end driver 120 operates to provide and update data that are displayed at the user's front end and essentially avoids providing or updating data that are not displayed. Further, the front end driver provides data and updates in a manner that to the user appears as if the data is available locally, in real time, such that when the user scrolls down the table, resizes the display of the table to include more rows, and so forth, the appropriate data are displayed.

This is in stark contrast to conventional subscriber systems, which provide all of the table data to the user's front end when the user opens the table (or even before opening the table) and thereafter broadcast updates such that the user front end locally updates all of the data. The front end driver of the current system thus saves network resources and bandwidth and also frees memory resources at the user front end by providing at any given time only data and updates that correspond to the user's front end display.

We explain the system 10 in terms of opening tables to display data. The system may be used with other types of data display, and is particularly adapted for use with data that are frequently updated. Thus, while the illustrative embodiment described below is directed to displaying particular entries, rows, and/or columns of a table, the system may be used to display any number of selected data items of a plurality of data items. For example, the selected data items may be particular entries of a table, particular elements of a graphic, particular colors of a palette, or any other subset of a plurality of data items as would be apparent to those skilled in the art.

Figure 1:
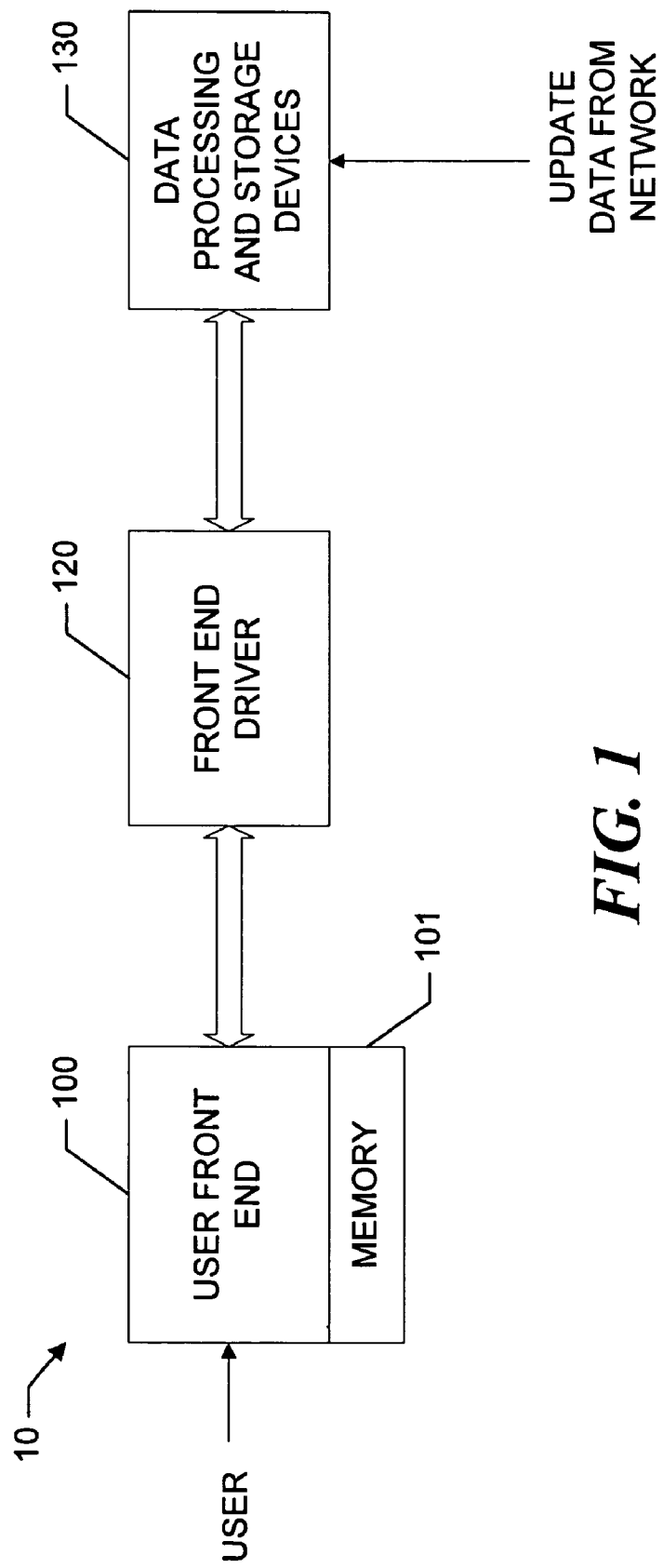
FIG. 1 is a functional block diagram of a system constructed in accordance with the invention.
Figure 2:
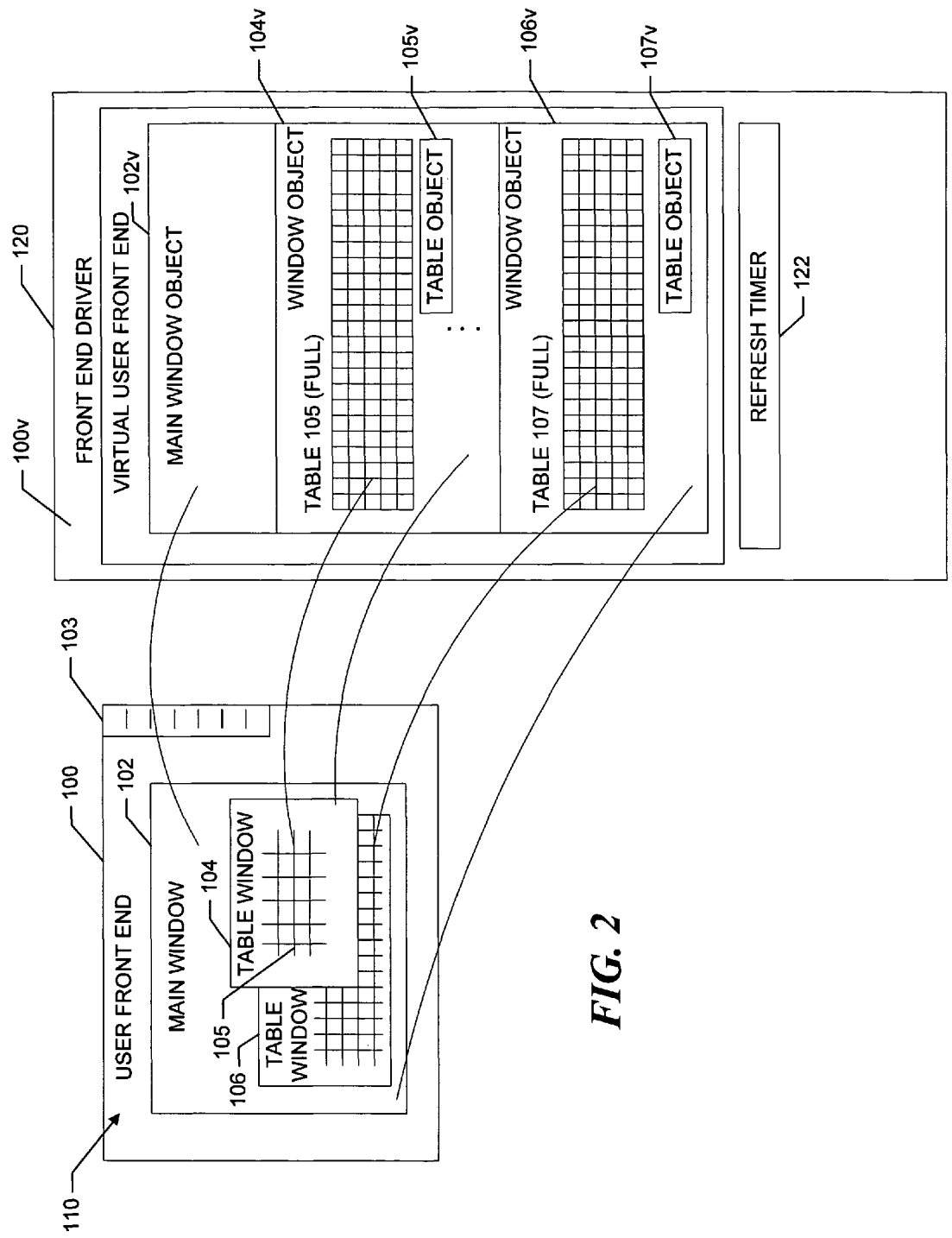
FIG. 2 is a more detailed functional block diagram of a component of the system of FIG. 1.
Figure 3:
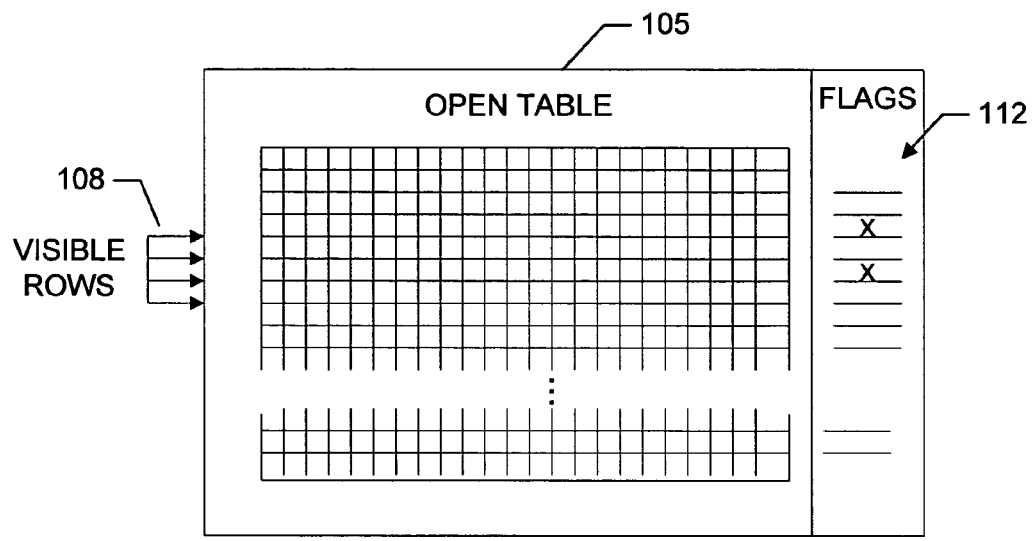
FIG. 3 illustrates in views A and B operations of the component of FIG. 2.
Figure 3:
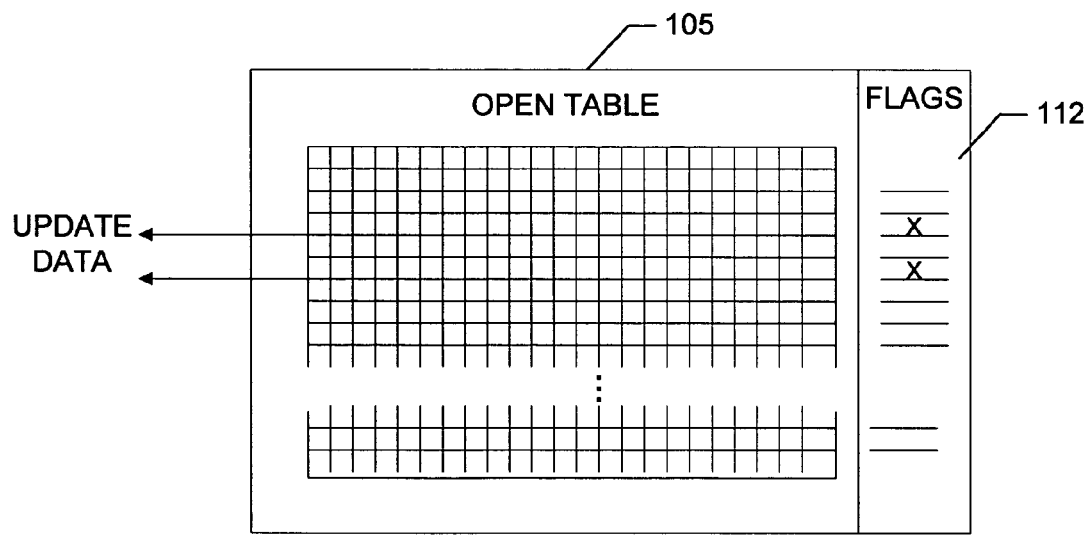

Referring now also to FIGS. 2 and 3, when a user logs on to the system 10 through the user front end 100, the system opens in a display 110 a main window 102 that offers to the user various menus 103 and so forth to, for example, open tables to display data of interest. In the example, the menu may be used to open a stock trading table, a bond trading table and so forth.

At the same time, the front end driver 120 creates a corresponding virtual user front end 100v with a main window object 102v. When the user opens, through the menu 103, a window 104 for a stock trading table 105, the front end driver opens a corresponding stock table window object 104v and a stock table object 105v. Similarly, when the user opens a second window 106 for a bond trading table 107, through the main window 102 or through the stock table window 104, the front end driver opens a second table window object 106v and a corresponding table object 107v, and so forth. The user front end 100 provides to the table objects control information, such as, for example, first table row displayed and number of rows displayed, and so forth. The front end driver then determines which rows of the respective tables are visible to the user through the user front end display.

The front end driver 120 communicates with the data processing and storage devices 130, and in a known manner downloads the data for the opened tables 105 and 107 to the associated virtual user front end, or more particularly, to the associated table window objects 104v and 106v, respectively. The front end driver then through the control information provided to the table objects 105v and 107v determines which table rows are visible in the display at the user front end. At selected refresh intervals, for example, fractions of a second, the front end driver provides to the user front end 100 the data that correspond to the rows that are determined to be then visible in the display 110. At a first refresh time after the table is opened, for example, the front end driver provides to the user front end the data for each of the visible or partially visible rows in the two opened tables.

As the data processing and storage devices 130 update data for the full tables 105 and 107, the updated data are provided to the front end driver 120. The front end driver then updates the tables and sets dirty flags 112 for the updated rows. The updated data are not provided to the user front end 100, however, until a next refresh cycle.

When a refresh timer 122 goes off, the front end driver 120 calls a Display Data function associated with the virtual user front end 100v and does the same for every other virtual user front end (not shown). The virtual user front end 100v Display Data function then calls, for each window object 104v, 106v open within it, a Window Display Data function that, in turn, calls respective Table Display Data functions for the table objects 105v, 107v open within the respective windows. Each Table Display Data function checks the rows of the associated full table that correspond to the rows that are visible in the user front end, to determine if any of the rows have dirty flags 112 set. If one or more flags are set, the Table Display Data function calls a GetCellData function, which provides the data for the flagged rows to the user front end. At the end of the refresh operation, the front end driver resets the dirty flags 112.

As noted, the timing of the refresh intervals differ from the timing of the table update intervals and the data transfer rates may vary as well. The table update interval timing may vary due, for example, to an amount of network traffic between the front end driver 120 and the storage devices 130, while the refresh interval may be regulated by the front end driver 120 to conform to the bandwidth and processing capacity of the user front end 100. Thus, during a table update interval large amounts of data may be provided to the front end driver 120 at a high data rate through a connection specially suited to that purpose, while the selected data may be provided to the user front end 100 at a lower data rate through a more conventional connection within the user's network.

At the user front end 100 the data for the visible rows are maintained in a memory 101 and the data for the rows that are not then visible are discarded. Accordingly, the memory need only be large enough to maintain the maximum amount of data that can be displayed at a given time in the main window 102. The user front end then displays the data held in the memory 101 in the windows 104, 106.

When a user scrolls down a displayed table, for example, table 105, the user front end 100 sends updated control information to the front end driver 120, to inform the front end driver of the new top row and the number of rows that are visible in the front end display. The front end driver then updates the control information in the associated table object, and sets dirty flags for the newly visible rows in the table that is contained in the corresponding window object. At a next refresh cycle, the front end driver provides to the user front end the data for any flagged rows, which include the newly visible rows and also any updated rows that are then still visible. As discussed, the refresh cycles occur at a rate that is selected to provide data to the user front end in what appears to the user to be real time. The data are thus provided at a rate that is faster than the scroll rate of the display, and there is no perceived delay at the user front end.

Similarly, when a user resizes a window to display more of a table, the front end driver 120 updates the control information to reflect the new number of rows and the new top visible row and flags the new rows in the table of the corresponding window object. The front end driver then provides data for flagged rows, that is, the newly visible rows as well as the updated rows that remain visible at the next refresh cycle. As discussed, the refresh operation provides the data in what appears to the user to be real time.

The user thus has available essentially at all times all of the data in the tables 105 and 107 and all of the updates to the data, while the user front end receives and stores only the data which at a given time is displayed to the user, and network resources and bandwidth are thus saved. As described, the updating of the information that is visible to the user is done at predetermined intervals, regardless of when the information is updated in the database tables, again preserving network bandwidth and resources and providing an orderly, managed flow of data to the user front end. The updating, however, occurs at a rate that provides the user with the ability to resize and/or scroll down through, for example, a table, to view other rows in what appears to the user to be real time. Remote users are thus able to view data and perform operations based on that data, without having to download and maintain locally associated data that is not then of interest.

When a user has open a plurality of windows that are nested, the respective associated virtual window objects may contain control information that pertains to what data would be visible if each window were unobstructed. Accordingly, all of the data associated with what would be visible without the nesting may be sent to the user front end 100. Alternatively, the system may send only the data associated with the portions of, in the example, the rows or columns that are actually visible within the respective windows through the nesting of the windows. Further, if some of the windows are instead "minimized" or entirely obscured, the system may but need not send the data for these windows. Thus, network bandwidth, processing resources, and memory 101 may be conserved, as appropriate, even when a large number of windows are "open" but their data contents are not then visible at the user front end 100.

The front end driver 120 may service multiple user front ends 100. To accommodate multiple users opening the same database table, the virtual window objects 104v and 106v will contain "row-pointer tables" rather than the full database tables. The row pointer tables contain rows that correspond to the rows of the associated database tables, and contain in the respective rows pointers to the corresponding rows of the full database table. Thus, a full database table is stored once at the front end driver and multiple pointer row tables are stored for the multiple users that are viewing the same table.

The row pointer table also includes, in the respective rows, flags that are set to indicate the rows that are visible at the user front end. The front end driver thus sets the flags based on the control information contained in the corresponding table object. The system uses the flags to determine which rows to check for updates, that is, which rows of the full database table to check for set dirty flags, during the refresh cycles.

The respective row-pointer table may also be re-arranged to correspond to the arrangement of the table at the user front end. For example, the row-pointer table may have the rows arranged in the alphabetical order of the entries in a given field of the full database table. The control information provided from the user front end corresponds to the re-arranged rows, and thus, the system readily accommodates the updating of the visible rows, scrolling down the rows, and so forth.

The system described above may be used with other control information from which the front end driver can determine the data of interest, and the system operations are thus not limited to database tables. Further, the data of interest may be selected columns of a database table or particular entries of selected table rows. The dirty flags may thus be set for the columns as well the rows. Alternatively, the system may send all column entries of interest for newly visible or updated rows.

The front end driver 120 downloads data from the data processing and storage devices 130 in a known manner in accordance with any privileges associated with the user. For example, a given user may have rights to view particular market information, and thus, the tables downloaded for this user will contain only those entries that the user is entitled to view. While the users are generally remote users and thus benefit from acquiring and maintaining the relatively small amount of data that is displayed at the user front ends, the front end driver is typically located and/or operates to communicate with the devices 130 in a manner that allows fast downloading of, for example, data for the full table, and the updating of the full table data. The network bandwidth and resources are thus freed for other system operations.

It will be appreciated from the above-described embodiment that a system embodied in accordance with the invention facilitates the development and maintenance of user front ends because almost all of the business logic is implemented in the front end driver. This provides a significant advantage in a system that includes hundreds of users but only one front end driver. In a system embodied in accordance with the invention, front end start-up is also extremely quick, essentially instantaneous. This also provides the advantage of assuring rapid access to requested data by system users.

It can thus be seen in the advantages set forth above, including those made apparent from the preceding description, are efficiently attained with the invention. Those skilled in the art will appreciate that various modifications may be made to the specific embodiment described herein without departing from the scope of the invention.

What is claimed is:

1. A method of providing to a user front end selected data items from a plurality of data items provided over a network by a data storage device, comprising:
    associating a front end driver that is at a first location operatively connected to the network with the user front end that is at a second location operatively connected to the network;
    opening one or more windows to display data on a display connected to the user front end;
    determining at the front end driver which data items of the plurality of data items are to be visible for display at a given time in the respective one or more open windows at the user front end, wherein determining comprises
    providing, from the user front end over the network to the front end driver, control information associated with the data items to be visible for display at the user front end;
    selecting for downloading to the front end driver from the data storage device the data items determined by the control information to be visible for display at the user front end;
    sending selected data items to the user front end over the network from the front end driver; and
    displaying the selected data items in the respective one or more open windows at the user front end.

2. The method of claim 1 wherein the data items to be displayed comprise a table of data, and wherein determining selected data items includes determining which entries of the table will be visible in the respective one or more open windows.

3. The method of claim 2 wherein the table of data comprises a stock trading table having information associated with at least one stock.

4. The method of claim 2 wherein
    determining which particular entries of the table to select further includes determining a number of columns or rows of the table that are to be visible in the respective one or more open windows, and
    wherein providing control information includes identifying for the respective one or more windows a first column or row of the number of columns or rows and providing the number of columns or rows to the user front end.

5. The method of claim 1 wherein associating the front end driver with the user front end includes
    opening a virtual user front end at the front end driver, and
    storing, at the virtual user front end, one or more virtual objects associated with the one or more respective open windows, the virtual objects containing the control information.

6. The method of claim 5 further comprising:
    opening a next window on the display;
    storing, at the virtual user front end, a next virtual window object corresponding to the next open window; and
    associating, with the next virtual window object, control information that specifies which data items are to be visible in the next open window.

7. The method of claim 6 further comprising:
    opening a table within the window on the display connected to the user front end;

associating, with the virtual window object, a virtual table object corresponding to the open table; and associating, with the virtual table object, control information that specifies as selected data items the data items from that table that are to be visible in the open window.

8. The method of claim 1 wherein the step of sending the selected data items to the user front end occurs at a refresh interval.

9. The method of claim 8 wherein the refresh interval is selected to provide the selected data items to the user front end at a rate faster than a scroll rate of the display connected to the user front end.

10. The method of claim 9 wherein sending the selected data items to the user front end further includes at the front end driver associating flags with respective selected data items that are updated, and sending the flagged data items to the user front end at a next refresh interval.

11. The method of claim 1 wherein determining selected data items includes selecting different data items in response to one or more of the respective open windows being resized.

12. The method of claim 1 further comprising:

discarding, from the user front end, at least one data item of the selected data items in response to the at least one data item no longer being visible at the user front end.

13. A user front end for displaying data provided over a network by a data storage device, the user front end comprising:

a memory configured to store data items selected from a plurality of data items as to be visible for display at a given time on a display connected to the user front end;

a user interface configured to display the selected data items on the display; and a front end driver interface configured to communicate with a front end driver, to provide, from the user front end over the network to the front end driver, control information associated with the data items to be visible for display at the given time, the control information being used to determine which data items of the plurality of data items are to be visible for display at the given time, and to receive the selected data items from the front end driver over the network, wherein the front end driver is configured to download the plurality of data items from the data storage device and provide the selected data items determined by the control information to be visible for display at the given time to the front end driver interface.

14. The user front end of claim 13 wherein the plurality of data items includes a table of data and wherein the selected data items include particular entries of the table of data.

15. The user front end of claim 14 wherein the table of data comprises a stock trading table having information associated with at least one stock.

16. The user front end of claim 14 wherein the particular entries include one or more of a group consisting of a number of rows and a number of columns of the table of data, and wherein the control information identifies the particular entries.

17. The user front end of claim 14 wherein the user interface is further configured to display the selected data items in a window and to provide the control information for the front end driver to associate with a virtual object that corresponds to the window.

18. The user front end of claim 17 wherein the front end driver interface is further configured to receive from the front end driver the selected data items that are provided at a refresh interval and in response to the control information.

19. The user front end of claim 17 wherein the selected data items are determined in response to one or more of a group consisting of the window being resized and the window being scrolled.

20. The user front end of claim 14 wherein the user interface is further configured to display a plurality of overlapping windows, and wherein the front end driver interface is further configured to provide control information that corresponds to the data items to be visible for display in the respective windows.

21. The user front end of claim 20 wherein the front end driver interface is further configured to receive from the front end driver only the data items that are visible in the overlapping windows at the user interface as determined using the control information.

22. The user front end of claim 14 wherein the front end driver interface is further configured to receive the selected data items from the front end driver at a refresh interval.

23. The user front end of claim 22 wherein the refresh interval is selected to provide the selected data items to the user front end at a rate faster than a scroll rate of the user interface.

24. The user front end of claim 14 wherein the front end driver interface is further configured to receive an updated selected data item from the front end driver, the updated data item associated with a flag in response to the front end driver receiving the updated data item from the data storage device.

25. A front end driver for providing data items of a plurality of data items to one or more user front ends over a network for selectively displaying data, the front end driver comprising:

one or more user front end interfaces configured to communicate with the one or more user front ends and to receive from the one or more user front ends over the network control information associated with selected data items of the plurality of data items to be visible for display at a given time at the respective user front ends and to provide the selected data items determined by the control information to the respective user front ends, wherein the one or more user front ends are configured to display the selected data items on a display connected to the respective user front ends;

a data storage device interface configured to communicate with a data storage device and to receive the plurality of data items from the data storage device;

a memory configured to store the plurality of data items; and a processor configured to determine that the selected data items are to be visible for display at the given time at the respective one or more user front ends based on the control information and to provide, to the respective user front ends, the selected data items from the plurality of data items stored in the memory.

26. The front end driver of claim 25 wherein the memory is further configured to store, for each of the respective user front ends, the associated control information, and wherein the processor is further configured to provide the selected data items to each of the respective user front ends in response to the control information.

27. The front end driver of claim 26 wherein the processor is further configured to associate for the respective user front ends the selected data items with virtual objects that correspond to the data items selected for display at the respective user front ends.

28. The front end driver of claim 27 wherein the control information identifies the selected data items associated with the respective virtual objects, and wherein the processor is further configured to provide the selected data items in response to the control information.

29. The front end driver of claim 28 wherein a table of data comprises the plurality of data items, and wherein the selected data items include one or more of a group consisting of a number of rows of the table that comprise the selected data items and a number of columns of the table that comprise the selected data items, and the control information specifies at least one of the selected rows and columns.

30. The front end driver of claim 29 wherein the virtual objects contain row-pointer tables that include rows that correspond to the rows of the table of data and the respective rows of the row-pointer table contain pointers to the rows of the table of data, and flags that are set based on the control information to indicate the data table rows that are visible for display at the given time at the respective user front ends.

31. The front end driver of claim 27 wherein the memory is further configured to associate, for the user front end, the selected data items with a virtual object that corresponds to the data items selected for display at the user front end.

32. The front end driver of claim 25 wherein the processor is further configured to provide updated selected data items to the respective user front ends at one or more refresh intervals.

33. The front end driver of claim 32 wherein the data storage device interface is further configured to receive the plurality of data items from the data storage device at an update interval, and wherein the update interval differs from the one or more refresh intervals.

* * * * *